Feb. 14, 1961 F. M. FRAGA 2,971,775
SIDE DRAFT CONTROL UNIT FOR
TRACTOR-DRAWN IMPLEMENTS
Filed Nov. 30, 1959 2 Sheets-Sheet 1

INVENTOR
F. M. Fraga
BY
ATTORNEYS

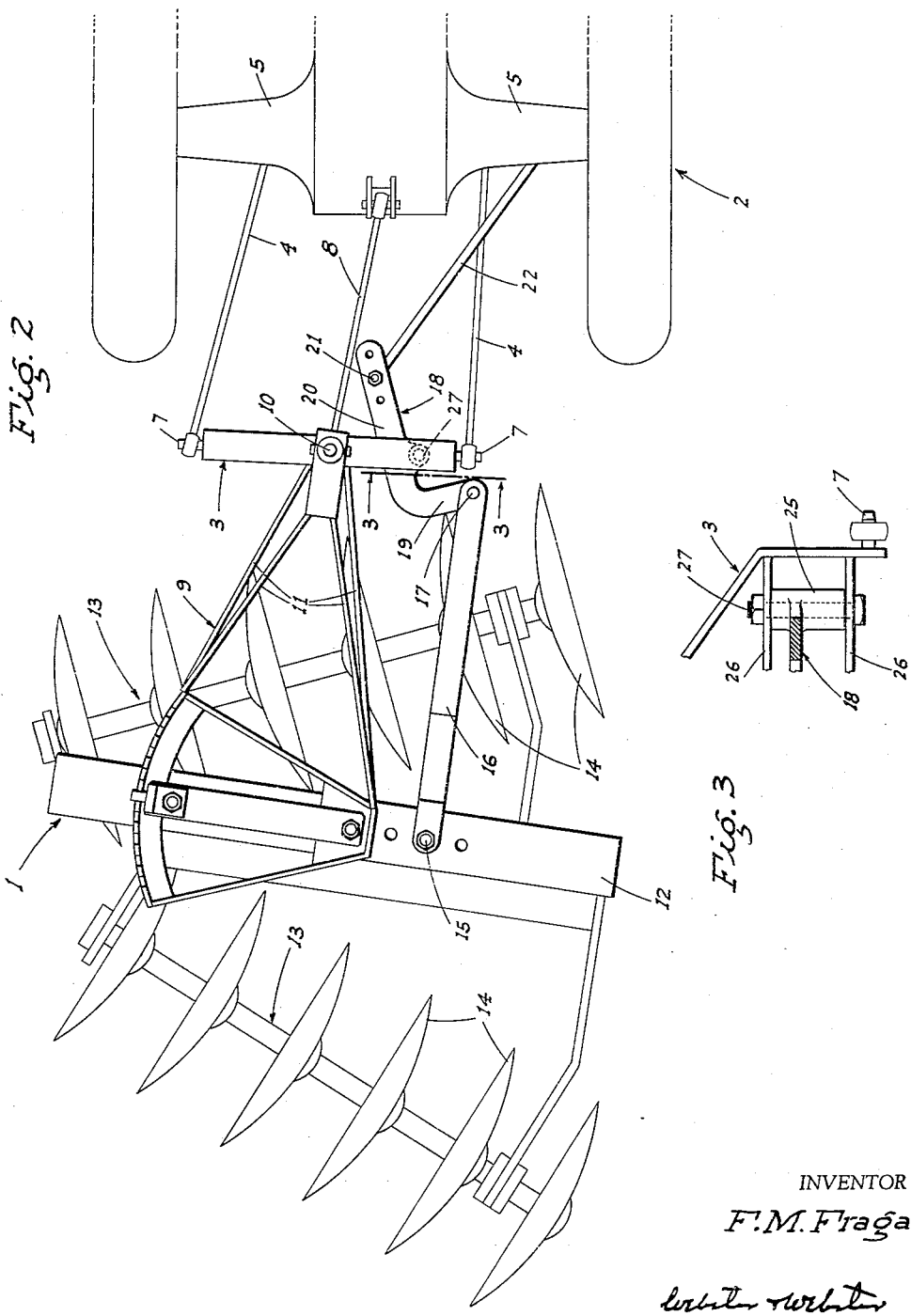

United States Patent Office 2,971,775
Patented Feb. 14, 1961

2,971,775

SIDE DRAFT CONTROL UNIT FOR TRACTOR-DRAWN IMPLEMENTS

Frank M. Fraga, 2133 East Terrace, Fresno 3, Calif.

Filed Nov. 30, 1959, Ser. No. 856,134

2 Claims. (Cl. 280—446)

This invention relates to tractor-drawn implements, and particularly to ground working implements, such as plows, which are influenced by laterally exerted soil pressures which tend to cause the implement to shift laterally relative to the line of draft. This in turn tends to pull the tractor to one side, making it hard to steer the same.

The major object of the present invention is to provide automatically functioning means arranged to act on the implement and counteract such lateral shifting of the same as it occurs, so that the implement and tractor will be restored to their initial and normal positions relative to each other.

Such an implement includes ground working members having ground or soil engaging faces disposed at a forward acute angle to the line of travel of the implement, so that the soil pressures against such faces tend to shift the implement laterally as it advances.

Another object of the invention is to mount the implement in connection with the tractor for horizontal swinging relative thereto, and to provide a side draft control unit between the tractor and implement arranged to automatically control the swinging movement in such a manner as to swing the implement in a direction to reduce the angle of ground working members to the ground whenever excessive or unbalanced soil pressures act to swing or shift the implement from a predetermined normal position, and thereby restore the implement members to such normal position.

It is also an object of the invention to provide a side draft control unit for tractor-drawn implements which is designed for ease and economy of manufacture; the structure of the invention being particularly an improvement over that shown in my Patent No. 2,874,975, dated February 24, 1959.

An additional object of the invention is to provide a practical, reliable, and durable side draft control unit for tractor-drawn implements, and one which will be exceedingly effective for the purpose for which it is designed.

These objects are accomplished by means of such structure and relative arrangement of parts as will fully appear by a perusal of the following specification and claims.

In the drawings:

Fig. 2 is a similar view, but showing the implement and tractor as shifted laterally relative to each other by an unbalanced pressure condition at the implement; the control unit then functioning to restore the implement and tractor to a properly lined-up position.

Fig. 3 is a fragmentary enlarged transverse section on line 3—3 of Fig. 2.

Figure 1:
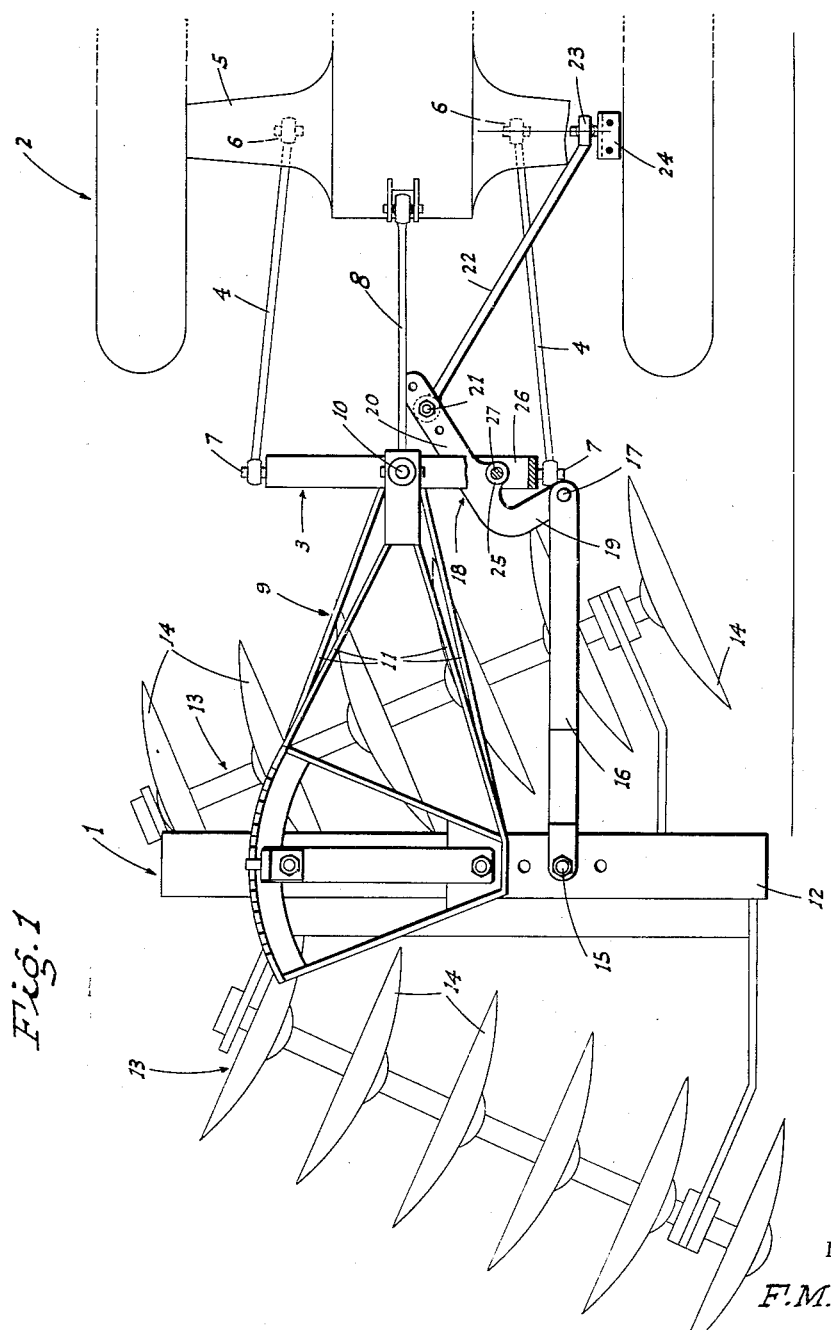
Fig. 1 is a top plan view of a tractor and implement combination, equipped with my improved side-draft control unit, and showing the tractor and implement as disposed in a normal or laterally balanced relation to each other.

Referring now more particularly to the drawings, and to the characters of reference marked thereon, the hitch used between the implement, indicated generally at 1, and the tractor, indicated generally at 2, is the same as that shown in my aforementioned patent, No. 2,874,975; such tractor being of the type having a combination draft and implement lift mechanism.

The hitch comprises an upstanding A-frame 3 of generally conventional form as used in connection with tractors of the above identified type. The lower draft arms 4 of the lift mechanism of the tractor are swivelly mounted at their forward ends on the tractor under the rear axle housing 5, as indicated at 6, while at their rear ends said arms are swivelly connected to lateral pins 7 projecting from the A-frame 3 at its lower end. The upper depth control link 8 of the lift mechanism is connected to the A-frame 3 adjacent its upper end, as is customary.

A draft unit 9 projects rearwardly from the A-frame 3 and is pivotally mounted thereon for relative rotation about a vertical shaft 10. The draft unit 9 includes horizontally diverging arms 11, and at its rear end such unit is adjustably connected to a heavy transverse beam or frame 12 so as to be normally rigid therewith and to which beam the oppositely angled implement gangs 13 are connected, and which are here shown as being disc plows 14.

Pivoted at its rear end on the beam 12 to one side of the draft unit 9, as at 15, is a forwardly projecting bar 16 which extends to a termination adjacent the corresponding side of the A-frame 3. At its forward end, the bar 16 is pivoted, as at 17, to the rear end of a bellcrank lever 18 disposed a short distance above the lower end of the A-frame 3, and whose rear leg 19 extends laterally inward from its pivot end and is disposed just to the rear of the A-frame 3. The front leg 20 of the lever 18 projects through the A-frame 3 to a termination some distance ahead of the same, as shown, and is adjustably pivotally or swivelly connected, as at 21, to one end of a link 22 which projects laterally out and forwardly to a termination below the tractor axle laterally out from the swivel mount of the adjacent draft arm 4. At such termination the link 22 is swivelly connected, as at 23, to a tractor-mounted bracket 24. This bracket is preferably disposed so that the axis of connection 23 alines with the axis of connection 6 of the adjacent arm 4, as shown in Fig. 1.

The lever 18 is formed intermediate its ends with a vertical sleeve or hub 25 which fits between a pair of vertically spaced transverse plates 26 or straps which are a part of the A-frame 3. A pivot pin 27 projects through the hub 25 in turnable relation, and is secured in the members 26, as shown in Fig. 3.

In operation, with an implement as shown, the lateral soil pressure against the front gang—if evenly balanced by a corresponding opposed pressure against the rear gang—will cause the implement and tractor to travel a straight line, as shown in Fig. 1, and the tractor may be easily steered.

Under these conditions, there is no appreciable movement of the lever 18 relative to the A-frame 3, and the pivot 17 connecting said lever and the bar 16 remains in a fixed position.

When, however, there is an unbalanced soil pressure against the disc, as when the lateral pressure against the front gang discs is greater than that against the rear gang discs, a side draft condition obtains which causes the implement to be forced toward the left while the tractor is forced to the right, as shown in Fig. 2.

When such conditions obtain, the side-draft unit is automatically brought into play to counteract and offset such relative lateral movement of the implement and tractor. The somewhat excessive relative lateral movement, as shown in Fig. 2, will seldom be actually obtained in ordinary operation, being thus shown for illustrative purposes.

As soon as the lateral pressure-caused shift of the implement to the left starts, the A-frame 3 is of course correspondingly shifted, since said A-frame is not rigid with the tractor. The lever 18, being mounted on the A-frame, is also shifted therewith.

As a result, the fixed-length link 22 pulls on the front arm 20 of the lever, swinging the same about the pivot pin 27 and turning the rear arm 19 of the lever toward the rear. This causes the bar 16 to be pushed rearwardly—a movement which imparts a rotative movement to the beam 12, the gangs 13, and the draft unit 9 secured thereto, about the pivot 10 as an axis. This rotative movement decreases the pressure angle between the front discs and the ground, while increasing the pressure angle between the rear discs and the ground. The unbalanced soil pressures against the gangs 13 are therefore thus offset and eliminated, and the implement and tractor are restored to their normal alinement as they move forwardly. The same action, in the opposite direction, is obtained when the soil pressures act excessively against the rear gang discs.

While I have here shown the soil engaging members as being disc plows, the side draft control unit will be equally effective with any other form of plow or member which tends to cause side draft.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In the combination of a tractor, an implement which includes a transverse frame and ground working members having ground engaging faces normally disposed at a predetermined forward acute angle to the line of draft of the implement, a hitch structure extending rearwardly from the tractor and including a transverse frame swivelly connected to the tractor for lateral movement relative thereto, and a draft unit extending between the frames, said unit being rigid with one frame and pivoted on the other, the tractor and implement being normally disposed in predetermined longitudinally alined relation to each other; a side draft unit connected to the tractor and the frames and functioning upon such relative swinging of the implement and lateral movement of the frame of the hitch structure to decrease the angle of the faces of the ground engaging members of the implement from said predetermined normal whereby the lateral soil pressure against said faces will be reduced to cause the implement to swing back to a normal position as the tractor and implement advance; said control unit comprising a lever pivoted on the hitch frame to one side of the connection of the draft unit therewith, a generally laterally extending link connected at one end to the lever and swivelly mounted at its other end on the tractor adjacent one side thereof, and a bar pivotally connected at one end to the lever and at the other end to the implement to one side of the draft unit.

2. In the combination of a tractor, an implement which includes a transverse frame and ground working members having ground-engaging faces normally disposed at a predetermined forward acute angle to the line of draft of the implement, a hitch structure extending rearwardly from the tractor and including a transverse frame swivelly connected to the tractor for lateral movement relative thereto, and a draft unit extending between the frames, said unit being rigid with one frame and pivoted on the other, the tractor and implement being normally disposed in predetermined longitudinally alined relation to each other; a side draft unit connected to the tractor and the frames and functioning upon such relative swinging of the implement and lateral movement of the frame of the hitch structure to decrease the angle of the faces of the ground engaging members of the implement from said predetermined normal whereby the lateral soil pressure against said faces will be reduced to cause the implement to swing back to a normal position as the tractor and implement advance; said control unit being disposed laterally out from the pivot of the draft unit and comprising a horizontal lever pivoted intermediate its ends on the hitch frame laterally out from the connection of the draft unit therewith, said lever including a front leg extending forwardly from the hitch frame and a rear leg disposed rearwardly of said frame and extending laterally out relative to the lever pivot, a bar pivoted at one end on the outer end of the rear leg and extending rearwardly to a pivotal connection with the implement to one side of the draft unit, and a link pivoted at one end on the front leg of the lever and extending thence diagonally and forwardly to a swivel connection with the tractor adjacent the corresponding side thereof.

References Cited in the file of this patent

UNITED STATES PATENTS

| Re. 15,219 | Gamble | Nov. 8, 1921 |
| 1,797,897 | Campbell et al. | Mar. 24, 1931 |
| 2,653,531 | Collins | Sept. 29, 1953 |
| 2,746,770 | Sorensen et al. | May 22, 1956 |
| 2,831,705 | Ellis | Apr. 22, 1958 |
| 2,874,975 | Fraga | Feb. 24, 1959 |